Patented May 7, 1935

2,000,533

UNITED STATES PATENT OFFICE 2,000,533

METHOD OF PRODUCING A FOOD POWDER

Robert T. Northcutt, Cranford, and Andrew Langstaff Johnston, Jr., Plainfield, N. J., assignors, by mesne assignments, to Food Concentrates, Inc., New York, N. Y., a corporation of Delaware No Drawing. Application May 13, 1932,
Serial No. 611,234

7 Claims. (Cl. 99—5)

This invention relates to an edible food product and to the process of making the same.

An object of the invention is to provide a process for manufacturing a dried edible food product rich in hygroscopic sugars and comprising a sufficient quantity of vegetable oil to protect the product from absorbing an undesirable amount of moisture or from caking through exposure to heat during normal commercial handling.

A further object is to provide a process of the character described in which the vegetable oil is added to the hygroscopic material in a manner to prevent the oil from becoming rancid.

A further object is to provide an edible food product comprising dried hygroscopic material coated with a substantially non-rancidifying vegetable oil.

A still further object is to provide a dried edible food product containing carbohydrates, fats and proteins in proportions to give a substantially balanced ration.

A still further object is to provide a dried food product of the character described comprising an intimate mixture of banana, oily nut or vegetable and yeast in such proportions as to constitute a substantially balanced ration.

Other objects of the invention will in part be obvious and will in part appear hereinafter.

The invention accordingly comprises the several steps and the relation and order of one or more of such steps with respect to the others and the product possessing the features, properties and the relation of constituents which are exemplified in the following detailed disclosure and the scope of the application of which will be indicated in the claims.

Heretofore it has been substantially impossible to satisfactorily dry carbohydrate materials rich in hygroscopic sugars, such as the ripe pulp of bananas and other fruits, in the ordinary commercial drying chamber. The temperature to which the material must be subjected to be properly dried results in charring or caramelizing the material deposited within the tower. Furthermore, the moisture taken up by the hot drying gases in the ordinary drying process is frequently found to be such that the deposited material, upon cooling slightly, becomes wet and sticky, making removal from the tower difficult.

We have disclosed in our copending application Serial No. 572,812, filed November 3, 1931, an apparatus and process for controlling temperature and humidity conditions during the drying of the material so that material of the character described may be delivered from a drying tower in a satisfactory dry powdery condition. In this condition the material is readily susceptible to moisture and temperature changes, because of its hygroscopic sugar content. In order to protect the material in its dry powdered form, oil may be added as a coating. It has been found that while mineral oils when added to the dry powdery material in small quantities function adequately to protect the dried particles from normal moisture and temperature changes, vegetable oils added to the material are ordinarily unsatisfactory because of their tendency to become quickly rancid. Nevertheless there are certain highly cogent reasons for the use of vegetable oils in preference to mineral oils as a protective coating.

This invention has for its primary object the provision of a process whereby vegetable oils may be made available as a coating for dried hygroscopic materials of the character described under circumstances, furthermore, which permit the materials to be dried in the ordinary commercial drying chamber without the close control of temperature and humidity conditions heretofore found necessary.

It has been found desirable to add to the material to be dried, for example a slurry of the pulp of ripe bananas, sufficient oil to give from 5% to 10% oil content in the finished dried material. With this oil added to the material before it is dried and intimately mixed therewith, it has been found that the hygroscopic sugars in the material are adequately protected so that if the material is introduced into an ordinary commercial spray drier and subjected to a quick drying temperature, it may be handled, removed from the drier and packaged without excessive lumping or caramelizing. It has been found, however, that when plain edible vegetable oils, as, for example, peanut oil, walnut oil, soy bean oil, etc., are added to the material before it is dried, the oils become rapidly rancid after the material is removed from the drier and unless the dried material is stored in vacuum or air-tight tins it becomes rapidly distasteful, if not inedible. Even if properly packaged the material described will turn rapidly rancid after the cans are opened and usually before the contents of the can can be completely used.

This invention contemplates the use not of plain vegetable oils as a protection in the drying of materials rich in hygroscopic sugars, but the use, rather, of the whole oily vegetable or nut, for example, whole peanuts, walnuts, soy beans, cocoanut meat, cocoa beans, etc. For the sake of facility of expression such materials will be referred to at times herein by the phrase "oily nut-like material." The whole nuts or vegetables are first preferably finely ground with the material to be dried, for example, the pulp of ripe bananas, orange juice, peach pulp, etc. A sufficient quantity of the vegetable or nut is added to the material to be dried to give in the final product a quantity of oil of from 5% to 10%. The material which has been intimately mixed and ground in the manner described is then passed through any commercial drying device of the spray chamber type and subjected to a quick drying temperature, for example, a temperature in the neighborhood of 325° F. at the inlet opening and 225° F. at the outlet opening of the drier. If desired, an emulsion may first be made of the ground oily nut or vegetable with water and this emulsion may then be added to a solution or suspension of the hygroscopic sugar material and the resulting mass passed through the spray tower and quickly dehydrated.

The temperatures at the tower inlet and outlet and the length of time the material is subjected to the hot drying gases should preferably be controlled to the end that the dried material may have a moisture content not in excess of 5%.

The dried product obtained from the process described above has little or none of the characteristic nutty odor of the added oily nut. The product does, however, acquire a somewhat nutty taste. In a product comprising, for example, bananas and peanuts, the resultant dried material when dissolved in milk imparts to the milk a predominant banana flavor, although a peanut taste is also discernible. By suitably mixing various oily nuts or vegetables with various sugar materials very pleasing combinations or blends of flavors may be secured. The loss of the harsh odor of the oily body used in the mix in the above-described process permits the use of cheap oily vegetables, as, for example, soy bean. Soy bean has ordinarily a harsh raw odor which is quite objectionable to most people. When the bean is mixed with a sugar material such, for example, as banana pulp and spray dried, the harsh odor practically disappears and the resultant product is by no means objectionable.

This invention contemplates the use of a sufficient quantity of oily nut or vegetable to furnish the material rich in hygroscopic sugars with sufficient oil to protect the material from ordinary temperature and humidity variations in a spray-drying apparatus. It has been found that if 5% to 10% of the final dried product is oil this is accomplished. Under certain circumstances it may be desirable to increase the oil content slightly.

A suitable mixture follows:

To 100 parts of fruit juice containing 10% sugar add about 3 parts by weight of walnuts containing approximately 50% oil, grind and mix thoroughly and spray dry within the temperature range indicated above. The resultant product will be found to contain from 10 to 15% of oil and the dried sugar material will be adequately coated and protected not only during the heating and drying, but thereafter. Due to the presence of the whole nut body the tendency of the oil to become rancid is very greatly reduced and the dried material will keep for some weeks exposed to air and reasonable amounts of moisture.

The process of this invention is excellently adapted to the manufacture of a substantially balanced ration containing suitable amounts of proteins, fats, and carbohydrates and many of the helpful vitamins and enzymes. For example, a mixture of the pulp of ripe bananas, finely ground peanuts and live yeast in suitable quantities may be spray dried, giving a resultant product rich in the vitamins, save vitamin D, and in enzymes of great value. The yeast spores are not killed by the spray drying process, but the cells are rendered substantially inactive by dehydration. Neither the vitamins nor the enzymes are destroyed. The taste of the yeast is substantially masked by the more dominant taste of the oily nuts, and if a suitable proportion of banana pulp, peanuts and yeast is used, the resulting dried product may have a protein, fat and carbohydrate content eminently suitable for human consumption. It has been found that a mixture of 280 pounds of banana pulp, 27 pounds of finely ground peanuts and 20 pounds of yeast will give a dried product having suitable proportions of proteins, fats and carbohydrates. The protein content, for example, will be in the neighborhood of 15%, the fat content will be in the neighborhood of 15% and the carbohydrate content in the neighborhood of 60%.

The mixture of banana pulp, peanuts and yeast should be finely ground and intimately mixed until a creamy mass is secured. This should then be spray dried in a tower having an inlet temperature of from 300 to 325° F., and an outlet temperature of from 200 to 225° F. The oil present in the nuts makes accurate humidity and temperature control of the drying tower unnecessary and protects the finished product from taking up undue amounts of moisture. It is, of course, to be understod that contact with excessive moisture should be avoided. To this end the material may be packaged and handled in chambers in which the relative humidity is kept preferably below 35%.

Since certain changes in carrying out the above process and certain modifications in the article which embody the invention may be made without departing from its scope, it is intended that all matter contained in the above description shall be interpreted as illustrative and not in a limiting sense.

It is to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent are:

1. The process of producing a food powder, which comprises forming an aqueous intimate mixture by incorporating ground oily nut-like material with a carbohydrate material containing hygroscopic sugar, and drying the mixture to produce a powder wherein the oily nut-like material gives protection against caking.

2. The process of producing a food powder, which comprises forming an aqueous intimate mixture by incorporating ground oily nut-like material with a carbohydrate material containing hygroscopic sugar, and drying the mixture in the presence of heat to form a substantially non-adherent powder.

3. The process of producing a food powder, which comprises forming an aqueous intimate mixture by incorporating ground oily nut-like material with a carbohydrate material containing hygroscopic sugar, the proportion of oil being from about 5 to about 15% of the other solids present, and drying the mixture in the presence of heat.

4. The process of producing a food powder, which comprises forming an intimate mixture by incorporating ground oily nut-like material with fruit juice or pulp containing hygroscopic sugar, and drying the mixture to produce a powder wherein the oily nut-like material gives protection against caking.

5. The process of producing a food powder, which comprises forming an intimate mixture by incorporating ground oily nut-like material and banana pulp, with drying the mixture to produce a powder wherein the oily nut-like material gives protection against caking.

6. The process of producing a food powder, which comprises forming an aqueous intimate mixture, by incorporating ground oily nut-like material and live yeast with a carbohydrate material containing hygroscopic sugar, and drying the mixture to produce a powder wherein the oily nut-like material gives protection against caking.

7. The process of producing a food powder, which comprises forming an intimate mixture of the pulp of ripe bananas, ground oily nut-like material and live yeast in the approximate proportions of 70, 7 and 5, respectively, and drying the mixture to form a substantially dry non-adherent powder.

ROBERT T. NORTHCUTT.
ANDREW LANGSTAFF JOHNSTON, Jr.